United States Patent
Kim et al.

(10) Patent No.: US 10,784,734 B2
(45) Date of Patent: Sep. 22, 2020

(54) TRANSVERSE FLUX RECIPROCATING MOTOR AND RECIPROCATING COMPRESSOR INCLUDING A TRANSVERSE FLUX RECIPROCATING MOTOR

(71) Applicant: LG ELECTRONICS INC., Seoul (KR)

(72) Inventors: Jaebeum Kim, Seoul (KR); Sangsub Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 248 days.

(21) Appl. No.: 15/884,457

(22) Filed: Jan. 31, 2018

(65) Prior Publication Data

US 2018/0219444 A1 Aug. 2, 2018

(30) Foreign Application Priority Data

Feb. 1, 2017 (KR) .......................... 10-2017-0014466

(51) Int. Cl.
*H02K 1/34* (2006.01)
*F04B 35/04* (2006.01)
(Continued)

(52) U.S. Cl.
CPC ............ *H02K 1/34* (2013.01); *F04B 35/045* (2013.01); *H02K 1/143* (2013.01); *H02K 1/146* (2013.01);
(Continued)

(58) Field of Classification Search
CPC . H02K 1/34; H02K 33/00; H02K 7/14; F04B 35/04
(Continued)

(56) References Cited

U.S. PATENT DOCUMENTS 3,461,806 A 8/1969 Barthalon
4,626,725 A * 12/1986 Kawada ................. H02K 1/185
310/216.127
(Continued)

FOREIGN PATENT DOCUMENTS

JP 2006-300306 11/2006
JP 2007-318858 12/2007
(Continued)

OTHER PUBLICATIONS

International Search Report dated May 24, 2018.
European Search Report dated May 30, 2018.

*Primary Examiner* — Terrance L Kenerly
(74) *Attorney, Agent, or Firm* — Ked & Associates LLP

(57) ABSTRACT

A transverse flux reciprocating motor and a reciprocating compressor including a transverse flux reciprocating motor are provided. The transverse flux reciprocating motor may include a stator having an inner stator and an outer stator located outside and spaced apart from the inner stator in a radial direction, at least one magnet coil wound on the stator, at least one magnet coupled to an outer circumferential surface of the inner stator or an inner circumferential surface of the outer stator and having different magnetic poles arranged in an orthogonal direction of flux generated by the magnet coil, and a mover inserted into a cavity formed between the inner stator and the outer stator, formed of a magnetic material and reciprocating with respect to the stator. A magnetic resonant spring for causing resonant motion of the mover with respect to the stator using a force moving to low magnetic resistance between the stator and the mover is implemented, thereby reducing a size and weight of the reciprocating motor and the reciprocating compressor including the reciprocating motor and obtaining higher efficiency.

17 Claims, 15 Drawing Sheets

(51) Int. Cl.
  *H02K 7/14* (2006.01)
  *H02K 33/00* (2006.01)
  *H02K 33/16* (2006.01)
  *H02K 1/14* (2006.01)

(52) U.S. Cl.
  CPC .............. *H02K 1/148* (2013.01); *H02K 7/14* (2013.01); *H02K 33/00* (2013.01); *H02K 33/16* (2013.01); *H02K 2201/12* (2013.01)

(58) Field of Classification Search
  USPC .............. 310/15, 181, 216.127, 216.129
  See application file for complete search history.

(56) References Cited

U.S. PATENT DOCUMENTS

| | | |
|---|---|---|
| 2003/0057780 A1 | 3/2003 | Corey |
| 2005/0057101 A1 | 3/2005 | Nakagawa et al. |
| 2007/0108850 A1* | 5/2007 | Chertok ................. H02K 1/145 310/15 |
| 2007/0152516 A1 | 7/2007 | Lee et al. |
| 2008/0007125 A1 | 1/2008 | Koyama et al. |
| 2010/0127442 A1 | 5/2010 | Muragishi et al. |
| 2013/0058811 A1* | 3/2013 | Hong ................... F04B 35/045 417/417 |
| 2015/0226468 A1* | 8/2015 | Kathayanatt .......... F25B 31/023 417/417 |

FOREIGN PATENT DOCUMENTS

| | | |
|---|---|---|
| JP | 2010-178484 | 8/2010 |
| JP | 2010-233298 | 10/2010 |
| KR | 10-0492615 | 6/2005 |
| KR | 10-0539813 | 1/2006 |

\* cited by examiner

TRANSVERSE FLUX RECIPROCATING MOTOR AND RECIPROCATING COMPRESSOR INCLUDING A TRANSVERSE FLUX RECIPROCATING MOTOR

CROSS-REFERENCE TO RELATED APPLICATION(S)

The present application claims priority under 35 U.S.C. 119 and 35 U.S.C. 365 to Korean Patent Application No. 10-2017-0014466, filed in Korea on Feb. 1, 2017, which is hereby incorporated by reference in its entirety.

BACKGROUND

1. Field

A transverse flux reciprocating motor and a reciprocating compressor including a transverse flux reciprocating motor are disclosed herein.

2. Background

A motor is an apparatus for obtaining rotational force or reciprocating force by converting electric energy into mechanical energy. This motor may be categorized into an alternating current motor (AC) and a direct current (DC) motor according to a power applied thereto.

The motor includes a stator and a mover (or rotor). The mover provided with a magnet rotates or reciprocates according to a direction of flux generated when current flows in a coil provided in the stator.

The motor may be categorized into a rotary motor and a reciprocating motor according to a motion type thereof. In a case of the rotary motor, the mover rotates with respect to the stator by flux generated in the stator by power applied to a magnet coil. In contrast, in a case of the reciprocating motor, the mover linearly reciprocates with respect to the stator.

The reciprocating motor is obtained by modifying flux of a motor, which has a stereoscopic structure, to a flat shape, and is a type of motor having a flat mover, which is arranged on a flat stator to linearly move according to change in a magnetic field of the stator. Recently, a reciprocating motor for a compressor has been introduced, in which a stator is formed in a cylindrical shape to have an inner stator and an outer stator, a magnet coil that generates an induced magnetic field at any one of the inner stator or the outer stator is wound, and a magnet provided with magnet poles arranged in an axial direction of the stator is provided in a mover to allow the mover to reciprocate in an air gap between the inner stator and the outer stator.

A reciprocating motor for a compressor is disclosed in Korean Registered Patent No. 10-0492615 (hereinafter, referred to as "related art 1") and Korean Registered Patent No. 10-0539813 (hereinafter, referred to as "related art 2"), which are hereby incorporated by reference. In the related art 1 and the related art 2, an outer stator or inner stator is formed in a cylindrical shape by radially stacking a plurality of iron cores formed of thin plates through punching. Related art 1 discloses a structure in which the plurality of iron cores is radially stacked in both the inner stator and the outer stator. Related art 2 discloses a structure in which the plurality of iron cores is radially stacked in the inner stator and circularly stacked core blocks are radially stacked in the outer stator as an improvement of related art 1.

However, in the above-described conventional reciprocating motor, as several hundreds of iron cores are individually punched and then radially stacked to form the inner stator or the outer stator as described above, it is difficult to punch and radially stack several hundreds of iron cores and to cylindrically fix the iron cores. Therefore, it is difficult to manufacture the inner stator and the outer stator.

That is, as many iron cores, that is, several hundreds of iron cores, are punched, manufacturing costs increase. In addition, as the iron cores are individually and radially stacked, an assembling process is difficult and an assembling time is excessively increased, thereby increasing manufacturing costs.

Further, even when a predetermined number of iron cores is individually stacked to form several core blocks and then the core blocks are radially stacked, as several hundreds of iron cores are punched and the iron cores are individually and radially stacked in the inner stator, the disadvantage of the assembling process of assembling the stator and the disadvantage of manufacturing costs required therefor still remain.

Furthermore, in the conventional reciprocating motor, in order to fix and maintain the inner stator and the outer stator in the cylindrical shape, a fixing ring is pressed. However, when the iron cores are individually stacked, it is difficult to stack the iron cores while aligning the positions of fixing grooves provided in the iron cores and to press and fix the fixing ring into the fixing grooves provided in the several hundreds of iron cores.

In addition, if the plurality of iron cores is combined to form the core blocks, the shapes of the core blocks are maintained through a general caulking process. If the areas of the iron cores are small, the shapes of some iron cores may be twisted and modified during the caulking process, and thus, the sizes of the iron cores cannot be reduced. Therefore, there is a limitation in downsizing the motor.

Also, the above-described conventional reciprocating motor has a problem in that the mover is supported by the mechanical resonance spring of a compressed coil spring but a specific period is not used as a drive frequency even within a drive frequency of a certain period due to resonance generated by the compressed coil spring.

Further, according to the conventional reciprocating motor, as the mechanical resonance spring of a compressed coil spring is installed, there is a restriction in terms of mechanical stress limit and vibration distance in view of properties of the compressed coil spring. For this reason, as the resonance spring should have a certain linear diameter and length, for example, there is a limitation in reducing a horizontal length of the reciprocating motor.

Furthermore, according to the conventional reciprocating motor, as the mechanical resonance spring of a compressed coil spring is installed, a spring support member for fixing both ends of the compressed coil spring should be provided in each of the mover and the stator, whereby a problem occurs in that a mechanical structure of the motor is complicated. Also, as a plurality of resonance springs should be pressurized at a high pressure to be installed at both front and rear sides of the mover, a problem occurs in that an assembly process becomes difficult.

In addition, according to the conventional reciprocating motor, as the mechanical resonance spring of the compressed coil spring is installed, while the mover is eccentrically disposed by a side force generated due to the properties of the compressed coil spring, friction loss with the stator increases.

Additionally, according to the conventional reciprocating motor, as the mover including a magnet is arranged to reciprocate between the outer stator and the inner stator, an air gap is formed at each of an outside and an inside of the mover, whereby an entire air gap is increased, and thus, a problem occurs in that motor efficiency is deteriorated. Also, according to the conventional reciprocating motor, as the thickness of a magnet frame supporting a magnet is large, and thus, the total weight of the mover is increased, power consumption is increased and an air gap between the outer stator and the inner stator is further increased, whereby a problem occurs in that motor efficiency is more deteriorated.

Finally, a reciprocating compressor, to which the above reciprocating motor is applied, still has the aforementioned problems of the reciprocating motor. For this reason, there is a limitation in downsizing the reciprocating compressor.

BRIEF DESCRIPTION OF THE DRAWINGS

Embodiments will be described in detail with reference to the following drawings in which like reference numerals refer to like elements, and wherein.

DETAILED DESCRIPTION

Figure 1:
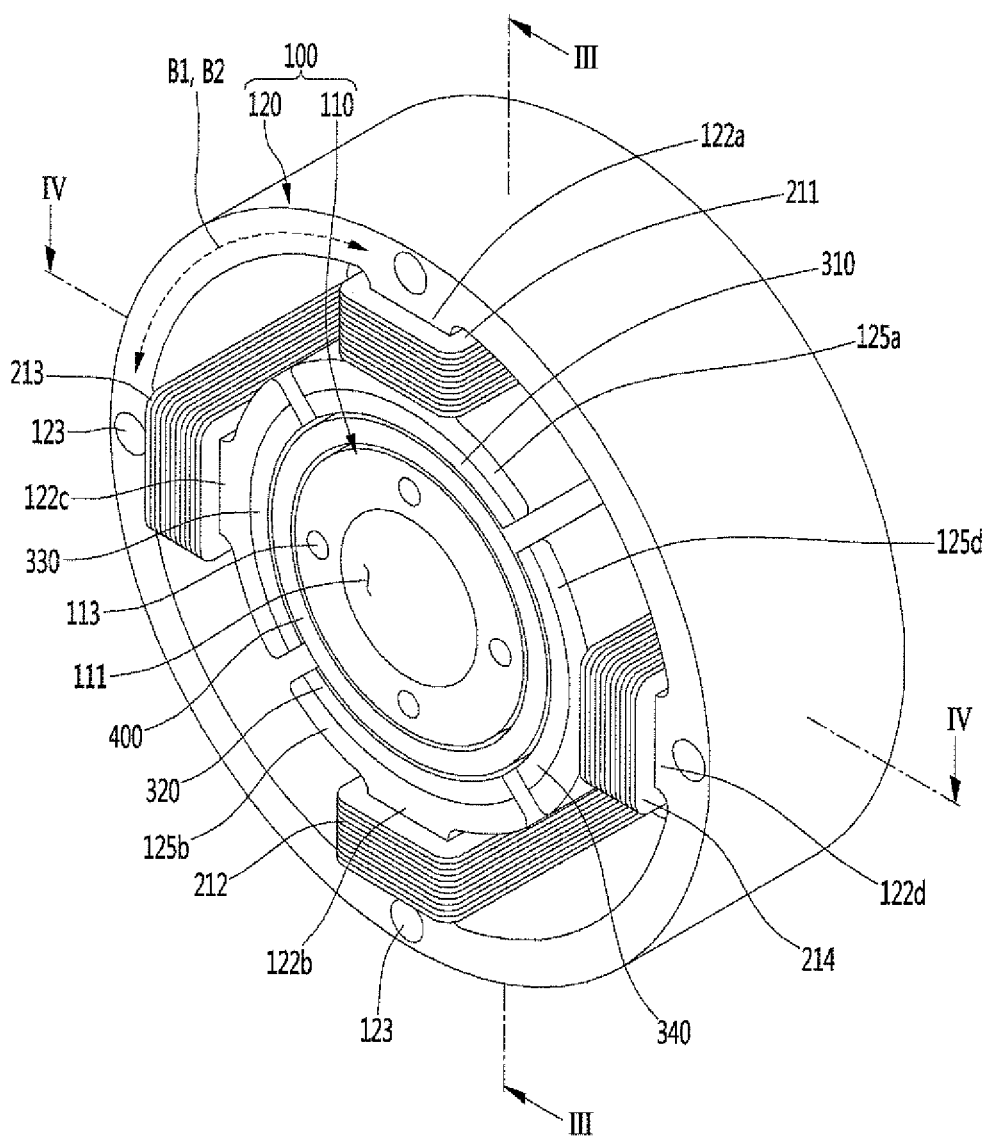
FIG. 1 is a schematic perspective view showing a transverse flux reciprocating motor according to an embodiment.
Figure 2:
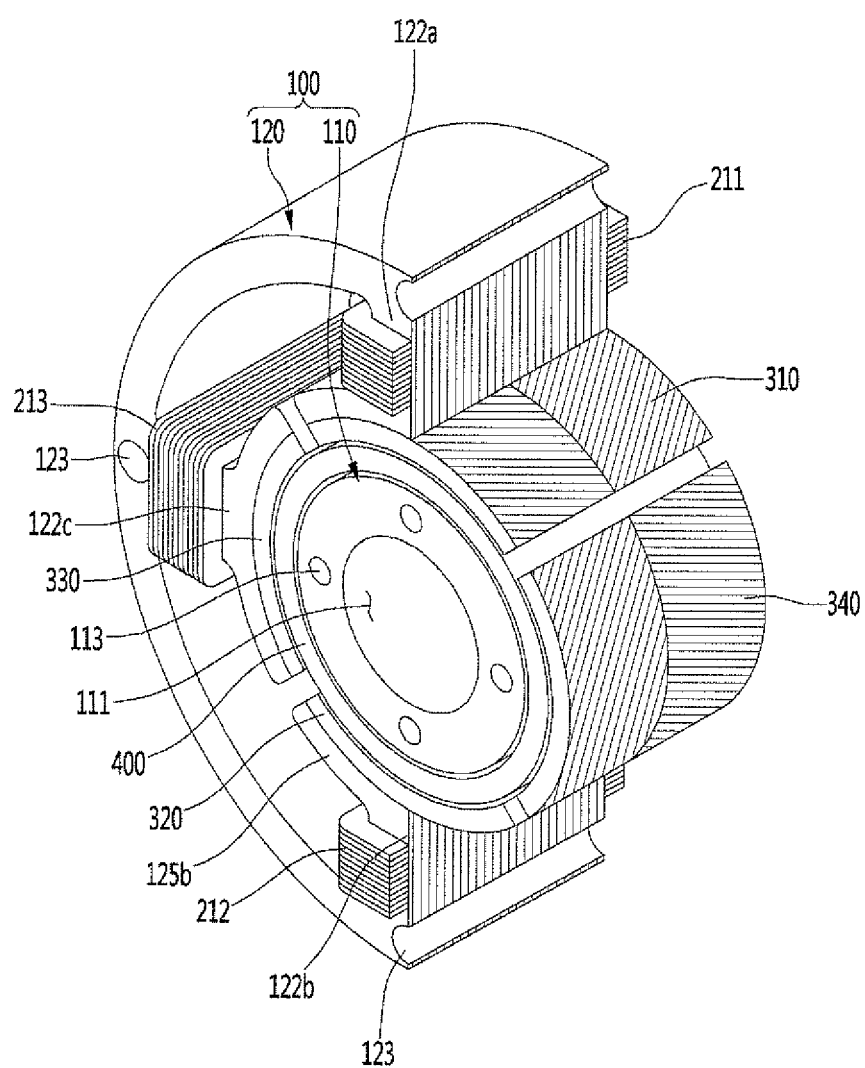
FIG. 2 is a perspective view showing parts of the transverse flux reciprocating motor of FIG. 1.

FIG. 1 is a schematic perspective view showing a transverse flux reciprocating motor according to an embodiment. FIG. 2 is a perspective view showing a part of the transverse flux reciprocating motor of FIG. 1.

As shown in FIGS. 1 and 2, the transverse flux reciprocating motor (hereinafter, referred to as a "reciprocating motor") according to an embodiment may include a stator 100, magnet coils 210, a magnet 300, and a mover 400. The stator 100 may include at least one of an inner stator 110 or an outer stator 120 located outside the inner stator 110 in a radial direction and spaced apart from the inner stator 110.

That is, the stator 100 may include only the inner stator 110 or the outer stator 120 or include the inner stator 110 and the outer stator 120.

Hereinafter, although the stator 100 includes the inner stator 110 and the outer stator 120, embodiments are not limited thereto and the stator 100 may include only the inner stator 110 or the outer stator 120. However, if the stator 100 includes only the inner stator 110, the mover 400 may be located outside and spaced apart from the stator 100, and the magnet 300 may be attached to an inner circumferential surface of the stator 100. In addition, if the stator 100 includes only the outer stator 120, the mover 400 may be located inside and space apart from the stator 100 and the magnet 300 may be attached to the inner circumferential surface of the stator 100.

If the stator 100 includes the inner stator 110 and the outer stator 120, an outer diameter of the inner stator 110 may be less than an inner diameter of the outer stator 120 and an air gap 130 is formed between the inner stator 110 and the outer stator 120. In addition, the inner stator 110 and the outer stator 120 configuring the stator 100 may be made of a magnetic material or a conductive material.

The inner stator 100 forms a cavity 111 and the cavity 111 is used as a space where a piston, for example, will be provided. The inner stator 110 and the outer stator 120 may be integrally formed and, in some cases, may be configured by stacking a plurality of blocks.

Figure 3:
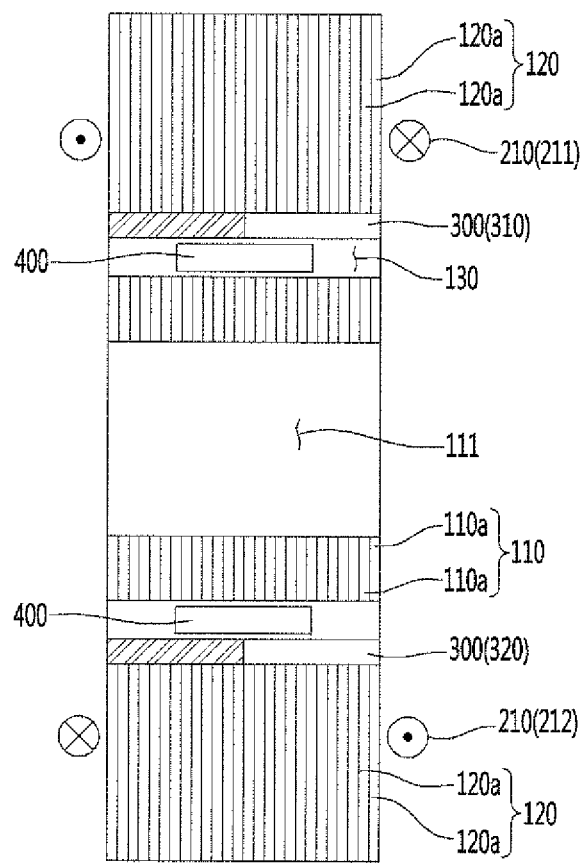
FIGS. 3 and 4 are cross-sectional views taken along lines III-III and IV-IV of FIG. 1.
Figure 4:
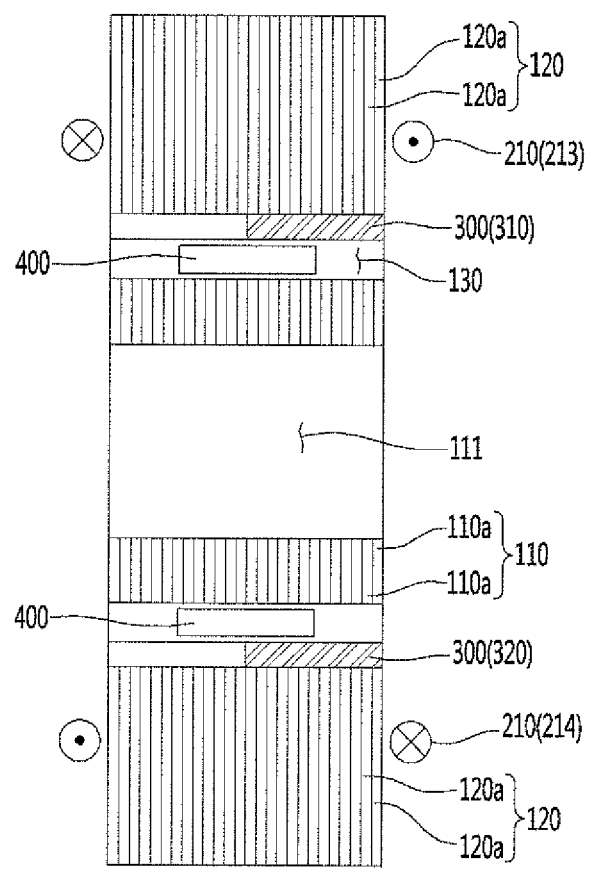

FIGS. 3 to 4 are cross-sectional views taken along lines III-III and IV-IV of FIG. 1. Referring to FIGS. 3 and 4, the inner stator 110 and the outer stator 120 may be configured by stacking inner core blocks 110a and outer core blocks 120a in an axial direction (a reciprocating direction of the mover).

As the inner stator 110 and the outer stator 120 are configured by stacking the inner core blocks 110a and the outer core blocks 120a in the axial direction, the blocks may be easily stacked as compared to the conventional method of radially stacking the blocks. In addition, the stacked state is advantageously maintained as compared to radial stacking.

The magnet coil 210 may be wound on the outer stator 120. For example, the magnet coil 210 may be directly wound on the outer stator 120.

As another example, the magnet coil 210 may be first wound and then coupled to the outer stator 120 in a state of being wound. More specifically, the magnet coil 210 may be wound on a bobbin through a separate winding device and then the magnet coil 210 may be coupled to the outer stator 120 by inserting the outer stator 120 into a cavity of the bobbin.

The magnet 300 may be coupled to the outer circumferential surface of the inner stator 110 or the inner circumferential surface of the outer stator 120. The magnet may be arranged to have different magnet poles in an orthogonal direction of flux generated by the magnet coil 210 of the magnet 300. More specifically, the magnet 300 may be arranged to have different magnet poles in the axial direction (the reciprocating direction of the mover).

In addition, the magnet 300 may be provided such that the cross section thereof has a circular or arc shape, thereby surface-contacting the outer circumferential surface of the inner stator 110 or the inner circumferential surface of the outer stator 120, which is a curved surface. More specifically, the magnet 300 may have a cylindrical shape or an arc-shaped cross section when viewed in the axial direction or a plurality of magnets may be spaced apart from each other on the outer circumferential surface of the inner stator 110 or the inner circumferential surface of the outer stator 120 in a circumferential direction. In addition, the magnet 300 may be a 2-pole magnet having an N pole and an S pole having a same length.

The magnet 300 is exposed to the air gap 130. In this embodiment, the magnet 300 may be fixed to the outer stator 120. As another example, the magnet 300 may be fixed to the inner stator 110. As another example, the magnet 300 may be fixed to the inner stator 110 and the outer stator 120.

In addition, the plurality of magnets 300 may be formed on the outer circumferential surface of the inner stator 110 or the inner circumferential surface of the outer stator 120 in the circumferential direction. An air gap may be formed between the magnets 300.

The magnet 300 may be arranged to have a magnet pole different from that of a neighboring magnet 300. For example, as shown in FIG. 1, if four magnets 300 are provided, a first magnet 310 located at an upper side of the figure may have a magnet pole different from those of a third magnet 330 located at a left side of the figure and a fourth magnet 340 located at a right side of the figure but may have the same magnet pole as a second magnet 320 located at a lower side of FIG. 1. Although not shown, if two magnets 300 are provided, an upper magnet and a lower magnet may have different magnet poles.

The mover 400 may be inserted into the air gap 130 formed between the inner stator 110 and the outer stator 120, may be made of a magnetic material, and may reciprocate with respect to the stator 100. In this embodiment, at least a part of an axial cross section of the mover 400 may have an arc shape. More specifically, the mover 400 may be formed as a single body and may have a cylindrical shape such that the mover 400 may be inserted into the cylindrical gap 130 formed between the inner stator 110 and the outer stator 120.

A plurality of movers 400 may be formed to have an arc-shaped cross section when viewed in the axial direction and may be spaced apart from each other in a circumferential direction. In this case, a gap may be formed between the movers 400 and joints made of a non-magnetic material may be formed in the gap. By the joints, the plurality of movers 400 may be coupled as a single body.

The mover 400 may be connected to a piston through a connector 70. For example, the connector 70 may have a cylindrical shape to be connected to the inner circumferential surface or outer circumferential surface of the mover 400 having the cylindrical shape. As another example, the plurality of movers 400 each having an arc-shaped cross section may be spaced apart from each other along the circumference of the connector 70.

In addition, as the mover 400 is inserted at a gap from the magnet 300 and the outer surface of the inner stator 110 or the outer stator 120 exposed to the air gap 130, a size of the mover 400 is less than a size of the air gap 130. That is, a diameter of the inner circumferential surface of the mover 400 may be greater than a diameter of the outer circumferential surface of the inner stator 110 and a diameter of the outer circumferential surface of the mover 400 may be less than a diameter of the inner circumferential surface of the outer stator 120.

In addition, the mover 400 may be configured as a single body and, in some cases, may be configured by stacking a plurality of blocks. In the latter case, the plurality of mover core blocks (not shown) may be stacked in the reciprocating direction of the mover 400.

Referring to FIGS. 1 and 2 again, the outer stator 120 may include a yoke part or yoke 121 forming a magnetic path and a teeth parts or teeth 122 extending from the yoke part 121 in a radial direction to surround the mover 400. The magnet coil 210 may be wound on and coupled to the teeth part 122.

For example, the yoke part 121 may be formed in an annular shape and the teeth parts 122, on which the magnet coils may be wound, may extend from an inner circumferential surface of the yoke part 121 in the radial direction. A space 124 may be formed between the teeth parts 122 and the magnet coil 210 may be wound therein. Accordingly, the teeth parts 122 and the space 124 may be alternately formed in the circumferential direction.

An even number of teeth parts 122 may be formed at a predetermined gap in the circumferential direction of the stator 100, and the magnet coil 210 coupled to each teeth part 122 may form flux in an opposite direction of flux generated by a neighboring magnet coil 210. More specifically, the magnet coils 210 may be alternately wound in opposite directions along the circumferential direction. The flux direction of the teeth part 122 may be opposite to that of a neighboring teeth part in the circumferential direction.

For example, as shown in FIG. 1, if four magnet coils 210 are provided, a first magnet coil 211 located at an upper side of the figure may be wound in a direction opposite to a winding direction of a third magnet coil 213 located at a left side of the figure and a fourth magnet coil 214 located at a right side of the figure may be wound in a same direction as a second magnet coils 212 located at a lower side of the figure. In this case, the number of magnets 300 may be equal to the number of magnet coils 210 and the magnets 300 may be arranged to have a magnetic pole opposite to that of a neighboring magnet 300.

Figure 5:
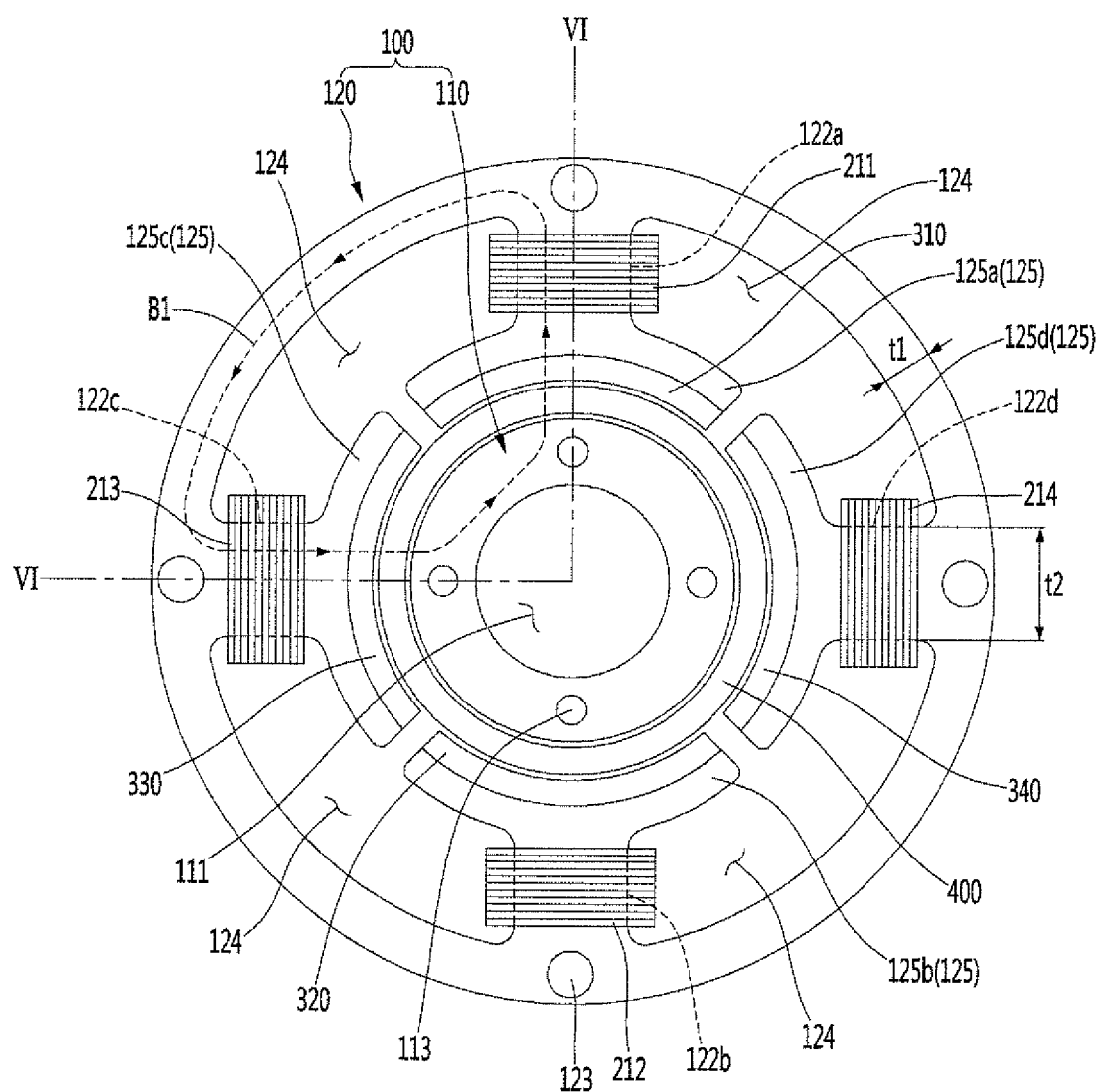
FIG. 5 is a front view showing the transverse flux reciprocating motor of FIG. 1.

FIG. 5 is a front view showing the transverse flux reciprocating motor of FIG. 1. Referring to FIG. 5, the teeth parts 122 may include a first teeth part or teeth 122a that extends from an internal upper end of the yoke part 121 downward, a second teeth part or teeth 122b that extends from an internal lower end of the yoke part 121 upward, a third teeth part 122c that extends from a left to a right of the yoke part 121 and a fourth teeth part 122d that extends from the right to the left of the yoke part 121. In addition, a stator pole part 125 having the magnet 300 fixed on an inner circumferential surface thereof may extend from an inner end of each teeth part 122 in the circumferential direction.

If a circumferential length of the stator pole 125 is greater than that of the magnet 300, another magnet may be influenced, and thus, the circumferential length of the stator pole may not be greater than that of the magnet. For example, the circumferential length of the stator pile 125 may be equal to that of the magnet 300.

The stator pole 125 may include a first stator pole 125a formed on an inner end of the first teeth part 122a, a second stator pole 125b formed on an inner end of the second teeth part 122b, a third stator pole 125c formed on an inner end of the third teeth part 122c and a fourth stator pole 125d formed on an inner end of the fourth teeth part 122d. The magnets 310, 320, 330 and 340 may be fixed to the stator poles 125a, 125b, 125c and 125d, respectively.

An even number of teeth parts, that is, at least two teeth parts may be formed and an even number of magnet coils 210 wound on the teeth parts 122 may be provided.

If the outer stator 120 is formed by stacking a plurality of outer core blocks 120a, a fastening hole 123 may be formed in each outer core block 120a and the plurality of outer core blocks 120a may be integrally coupled by a fastening member (not shown) that penetrates through the fastening hole 123. The fastening hole 123 may be formed in at least one of the yoke part 121 or the teeth parts 122.

If the inner stator 110 is formed by stacking a plurality of inner core blocks 110a, a fastening hole 113 may be formed in each inner core block 110a and the plurality of inner core blocks 110a may be integrally coupled. In addition, if the mover 400 is formed by a plurality of mover core blocks (not shown) in an axial direction, a fastening hole (not shown) may be formed in each mover core block (not shown) and the plurality of mover core blocks (not shown) may be integrally coupled by the fastening member (not shown) that penetrates through the fastening hole (not shown).

The yoke part 121 and the teeth parts 122 may be separated and a cavity 201 may be formed by the magnet coil 210, such that the yoke part 121 is inserted into the cavity 201 of the magnet coil 210 and then connected to the teeth parts 122 or the teeth parts 122 are inserted into the cavity 201 of the magnet coil 210 and then connected to the yoke part 121. For example, the yoke part 121 and the teeth parts 122 may be separated and then integrally connected.

As another example, the yoke part 121 may be separated into a plurality of yoke parts and then integrally connected. As another example, the teeth part 122 may be separated into a plurality of teeth parts and then integrally connected.

The plurality of yoke parts 121 and/or teeth parts 122 separated in various forms may be inserted into the cavity 201 of the magnet coil 210 and then connected to each other. The separated yoke parts 121 or the teeth parts 122 may be bonded into one body through welding, for example.

When the yoke part 121 or the teeth part 122 is separated into a plurality of yoke parts or teeth parts, the magnet coil 210 is not wound on the yoke parts 121 or the teeth parts 122 using a winding device (not shown) and a plurality of magnet coils 210 may be manufactured in an annular shape, the yoke parts 121 or the teeth parts 122 may be inserted into the cavities 201 of the magnet coils 210, and the magnet coils 210 may be coupled to the outer stator 120.

Referring to FIG. 5 again, a width t2 of the teeth part 122 may be greater than a width t1 of the yoke part 121. An area of a magnetic path of the teeth part 122 may be ensured to improve performance of the motor. Upon bolt fastening into the fastening hole 123, the yoke part 121 or the teeth part 122 may be suppressed from being distorted by torsional moment.

The reciprocating motor according to the embodiment including the above-described configuration may reciprocate by a reciprocating centering force generated among the stator 100 including the magnet coil 210, the magnet 300, and the mover 400. The reciprocating centering force may refer to a force moving to low magnetic energy (low magnetic position energy, low magnetic resistance) when the mover 400 moves within a magnetic field. This force forms a magnetic spring.

That is, in this embodiment, when the mover 400 reciprocates by the magnetic force generated by the magnet coil 210 and the magnet 300, the mover 400 accumulates force to be restored in a center direction by the magnetic spring and the mover 400 continuously reciprocates while resonating due to force accumulated in the magnetic spring.

Hereinafter, operation of the transverse flux reciprocating motor according to an embodiment will be described.

Figure 6:
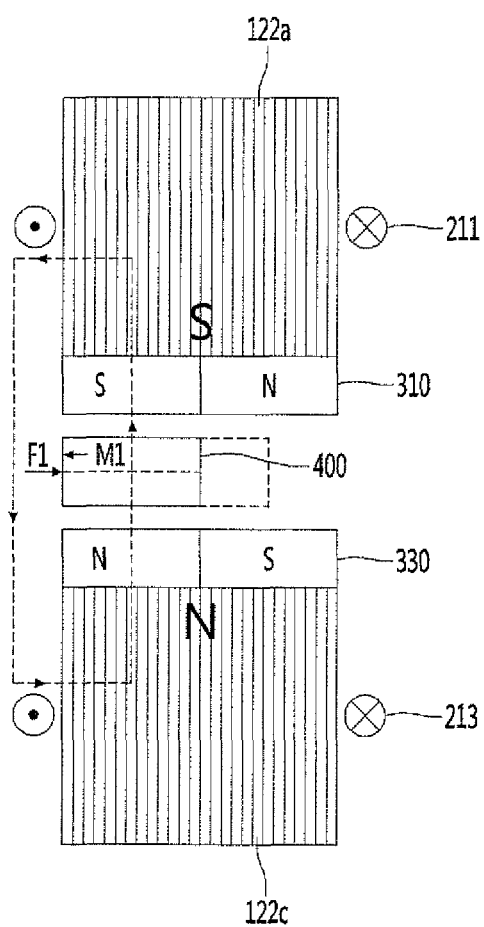
FIGS. 6 and 7 are schematic views taken along line VI-VI of FIG. 5 in order to explain operation of the reciprocating motor according to the present embodiment.
Figure 7:
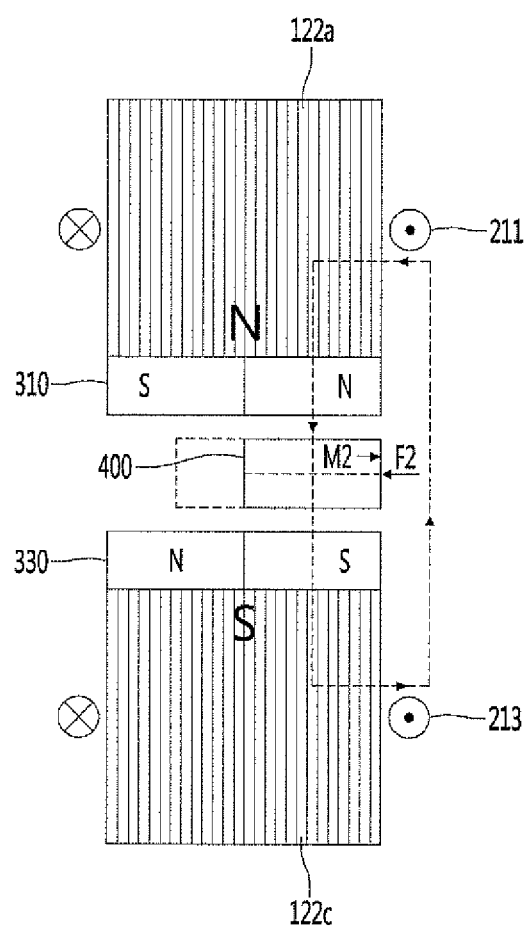

FIGS. 6 and 7 are schematic views taken along line VI-VI of FIG. 5 in order to explain an operation of the reciprocating motor according to an embodiment. First, when alternating current is applied to the magnet coils 211 and 213 of the reciprocating motor, alternating flux is formed in the stator 100. In this case, the mover 400 continuously reciprocates while bidirectionally moving in a flux direction.

In the reciprocating motor, a magnetic resonance spring is formed among the mover 400, the stator 100, and the magnet 300, thereby causing a resonant motion of the mover 400. For example, as shown in FIG. 6, when current is applied to the first magnet coil 211 and the third magnet coil 213 in an opposite direction in a state in which the magnets 310 and 330 are fixed to the outer stator 120, both fluxes are combined in the teeth parts 122a and 122c to flow in a same direction, such that the teeth parts 122a and 122c have different magnet poles. At this time, the mover 400, which is a magnetic material, moves in a leftward direction (see arrow M1) of the figure in which fluxes generated by the magnet coils 211 and 213 and fluxes generated by the magnets 310 and 330 increase.

The reciprocating centering force to be restored in a rightward direction of the figure having low magnetic energy (that is, low magnetic position energy or low magnetic resistance) is accumulated among the mover 400, the stator 100, and the magnets 310 and 330. In this state, as shown in FIG. 7, when the directions of currents applied to the first magnet coil 211 and the third magnet coil 213 are changed, the teeth parts 122a and 122c have magnet poles opposite to the previous magnet poles and the fluxes generated by the first magnet coil 211 and the third magnet coil 213 and the fluxes generated by the magnets 310 and 330 increase in a direction opposite to the previous direction, that is, in the rightward direction of the figure.

By the accumulated reciprocating centering force F1 and magnetic force generated by the fluxes of the magnet coils 211 and 213 and the magnets 310 and 330, the mover 400 moves in the rightward direction of the figure (see arrow M2). In this process, the mover 400 passes a center of the magnets 310 and 330 to further move in the rightward direction of the figure, by inertial force and magnetic force. Even at this time, similarly, reciprocating centering force F2 to be restored in the center direction of the magnets 310 and 330 having low magnetic energy, that is, the leftward direction of the figure, is accumulated among the mover 400, the stator 100 and the magnets 310 and 330.

As shown in FIG. 6, when directions of the currents applied to the first magnet coil 211 and the third magnet coil 213 are changed, the teeth parts 122a and 122c have magnet poles opposite to previous magnet poles, and the mover 400 moves in the center direction of the magnets 310 and 330 by the accumulated reciprocating centering force F2 and magnetic force generated by fluxes of the first magnet coil 211, the third magnet coil 213 and the magnets 310 and 330. Even at this time, the mover 400 passes the center of the magnets 310 and 330 to further move in the leftward direction of the figure, by inertial force and magnetic force, and reciprocating centering force F1 to be restored in the center direction of the magnet 300 having low magnetic energy, that is, the rightward direction of the figure, is accumulated among the mover 400, the stator 100, and the magnets 310 and 330. In this manner, the mover 400 continuously and repeatedly reciprocates in the rightward and leftward directions of the figure, as if a mechanical resonant spring is provided.

Figure 8:
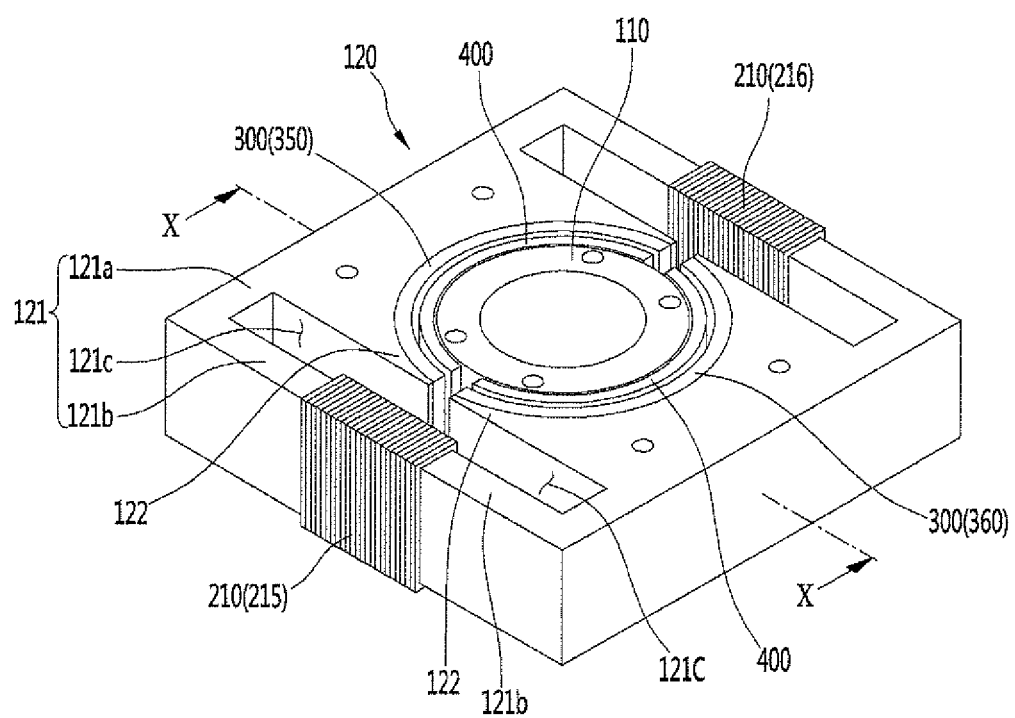
FIG. 8 is a perspective view showing a reciprocating motor according to another embodiment.

FIG. 8 is a perspective view showing a reciprocating motor according to another embodiment. Referring to FIG. 8, outer stator 120 may have yoke part 121 formed such that magnet coils 210 may be disposed on both sides of the teeth parts 122.

For example, the outer stator 120 may have the yoke part 121 formed in a rectangular ring shape, and the teeth parts 122 formed at both opposite inner side surfaces of the yoke part 121 to protrude toward a center thereof. An air gap may be formed between the opposite teeth part 122.

The yoke part 121 may include transverse yoke parts or yokes 121a that extend from both side surfaces of the teeth parts 122 and longitudinal yoke parts or yokes 121b that extend from ends of the transverse yoke parts 121a inward in an orthogonal direction. The teeth parts 122 may be spaced apart from each other to form slots 121c with the longitudinal yoke parts 121b and magnet attachment surfaces, to which the magnet 300 may be attached, may be provided in the teeth parts 122 in an arch shape. The longitudinal yoke parts 121b may be formed as a single body. In this case, the magnet coils 210 may be wound on the longitudinal yoke parts 121b.

Figure 9:
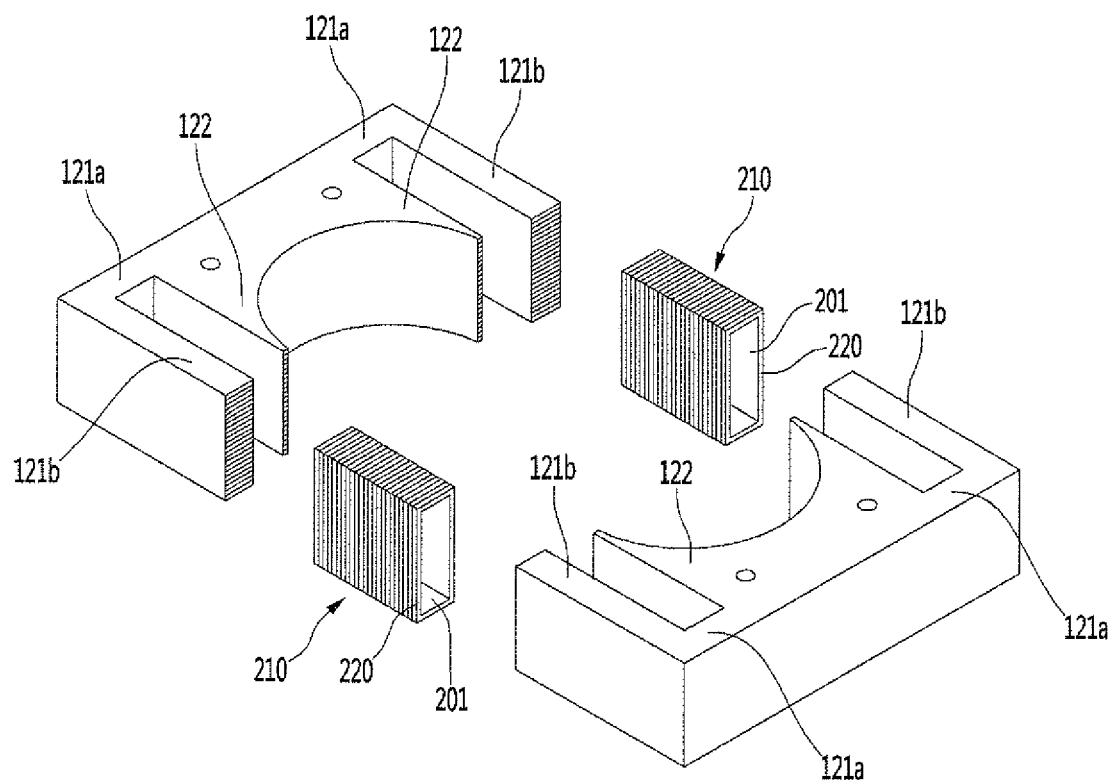
FIG. 9 is an exploded perspective view of the reciprocating motor of FIG. 8.

FIG. 9 is an exploded perspective view of the reciprocating motor of FIG. 8. Referring to FIG. 9, air gaps may be formed in centers of the longitudinal yoke parts 121b such that sides of the longitudinal yoke parts 121b are separated. That is, the air gaps may be formed between the yoke parts 121 as if the air gaps are formed between the opposite teeth parts 122.

In this case, the outer stator 120 may be divided into two outer stators. If the outer stator 120 is divided into two outer stators, ends of the longitudinal yoke parts 121b facing each other may be inserted into cavities 201 of magnet coils 210. Accordingly, flux may form a closed loop.

As the outer stator 120 is divided as described above, as the ends of the longitudinal yoke parts 121b are only inserted into the cavities 201 after winding the magnet coils 210 on a bobbin 220 having a cavity, the magnet coils 210 do not need to be wound on the longitudinal yoke parts 121b, thereby improving workability.

Figure 10:
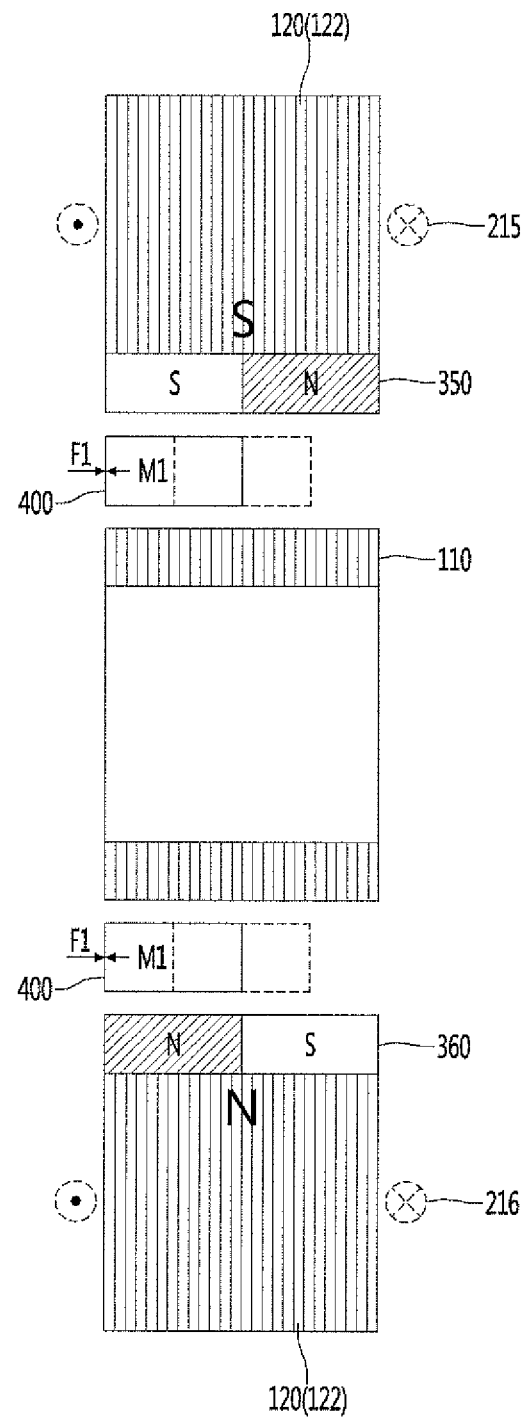
FIG. 10 is a schematic view taken along line X-X of FIG. 8 in order to explain an operation of the reciprocating motor according to an embodiment.

FIG. 10 is a schematic view taken along line X-X of FIG. 8 in order to explain an operation of the reciprocating motor according to an embodiment. Referring to FIG. 10, magnet coils 215 and 216 coupled to both yoke parts 121 may be wound in opposite directions. In addition, magnets 350 and 360 may be respectively attached to teeth parts 122 facing each other, the magnets 350 and 360 may form magnetic poles opposite to each other, and a gap may be formed between the magnets 350 and 360.

When current is applied to the magnet coils 215 and 216, fluxes flow in the yoke part 121 in opposite directions, but both fluxes are combined in the teeth parts 122 to flow in the same direction, such that both teeth parts 122 have different magnetic poles. The mover 400, which is the magnetic material, moves in a leftward direction (see arrow M1) of the figure in which the fluxes of the magnet coils 215 and 216 and the fluxes of the magnets 310 and 330 increase.

A reciprocating centering force (see arrow F1) to be restored in a rightward direction of the figure having low magnetic energy (that is, low magnetic position energy or low magnetic resistance) is accumulated among the mover 400, the stator 100, and the magnets 350 and 360. In this state, when the directions of currents applied to the magnet coils 215 and 216 are changed, fluxes of the magnet coils 215 and 216 and fluxes of the magnets 350 and 360 increase in a direction opposite to a previous direction, that is, in the rightward direction of the figure.

By the accumulated reciprocating centering force F1 and magnetic force generated by the fluxes of the magnet coils (magnet coils 215 and 216) and the magnets 350 and 360, the mover 400 moves in the rightward direction of the figure. In this process, the mover 400 passes a center of the magnets 350 and 360 to further move in the rightward direction of the figure, by inertial force and magnetic force.

Even at this time, similarly, the reciprocating centering force to be restored in a center direction of the magnets 350 and 360 having low magnetic energy, that is, the leftward direction of the figure, is accumulated among the mover 400, the stator 100, and the magnets 350 and 360. In this manner, the mover 400 continuously and repeatedly reciprocates in the rightward and leftward directions of the figure, as if a mechanical resonant spring is provided.

Figure 11:
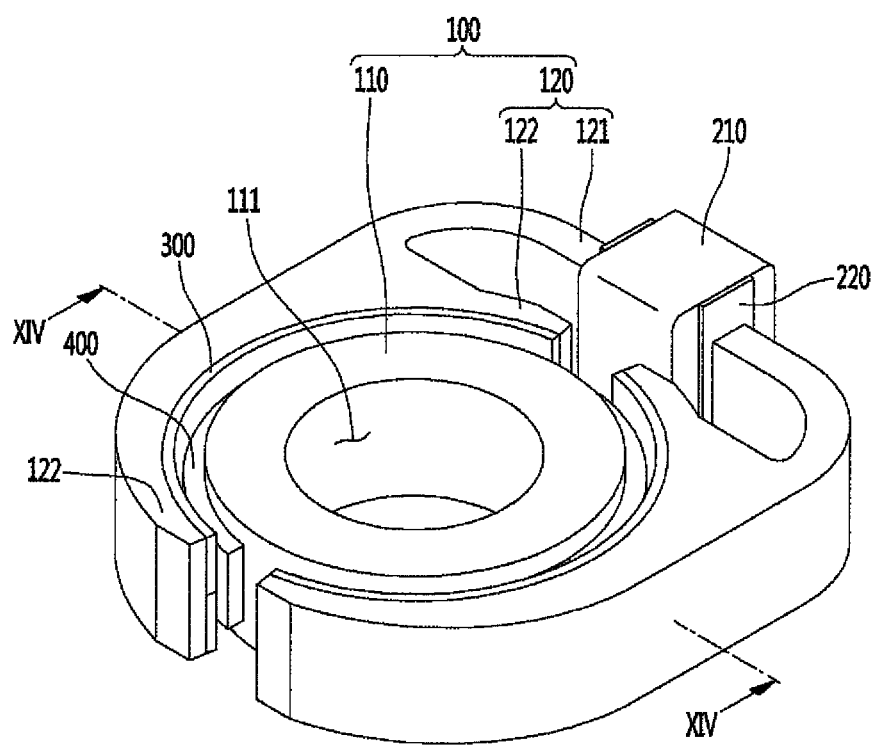
FIG. 11 is a perspective view showing a reciprocating motor according to another embodiment.
Figure 12:
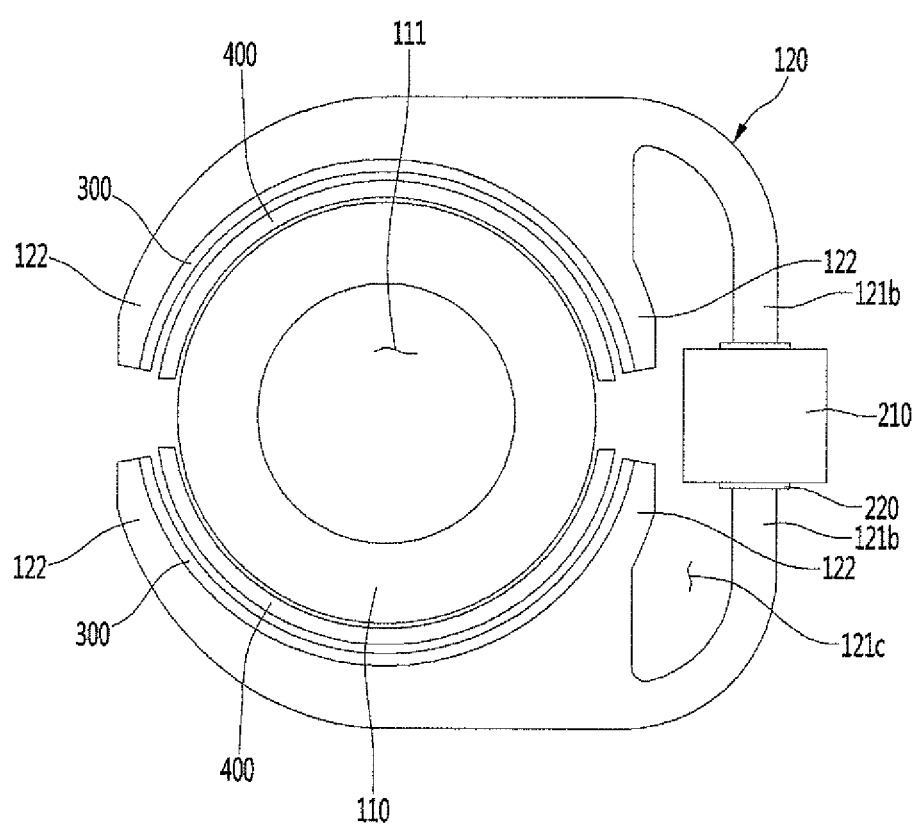
FIG. 12 is a front view showing the transverse flux reciprocating motor of FIG. 11.

FIG. 11 is a perspective view showing a reciprocating motor according to another embodiment. FIG. 12 is a front view showing the transverse flux reciprocating motor of FIG. 11.

Referring to FIGS. 11 to 12, the outer stator 120 may include yoke part or yoke 121 formed such that magnet coil 210 may be disposed at one side of teeth part or teeth 122. For example, the yoke part 121 may include a transverse yoke part or yoke 121a that extends from one side of the teeth part 122 and longitudinal yoke parts or yokes 121b that extend from an end of the transverse yoke part 121a in an orthogonal direction.

In addition, the teeth parts 122 may be spaced apart from the longitudinal yoke parts 121b to form a slot 121c therewith, and a magnet attachment surface, to which the magnet 300 may be attached, may be provided in the teeth part 122 in an arch shape. An air gap is formed between the teeth parts 122 facing each other.

The longitudinal yoke parts 121b may be formed as a single body. In this case, the magnet coil 210 may be wound on the longitudinal yoke parts 121b.

Figure 13:
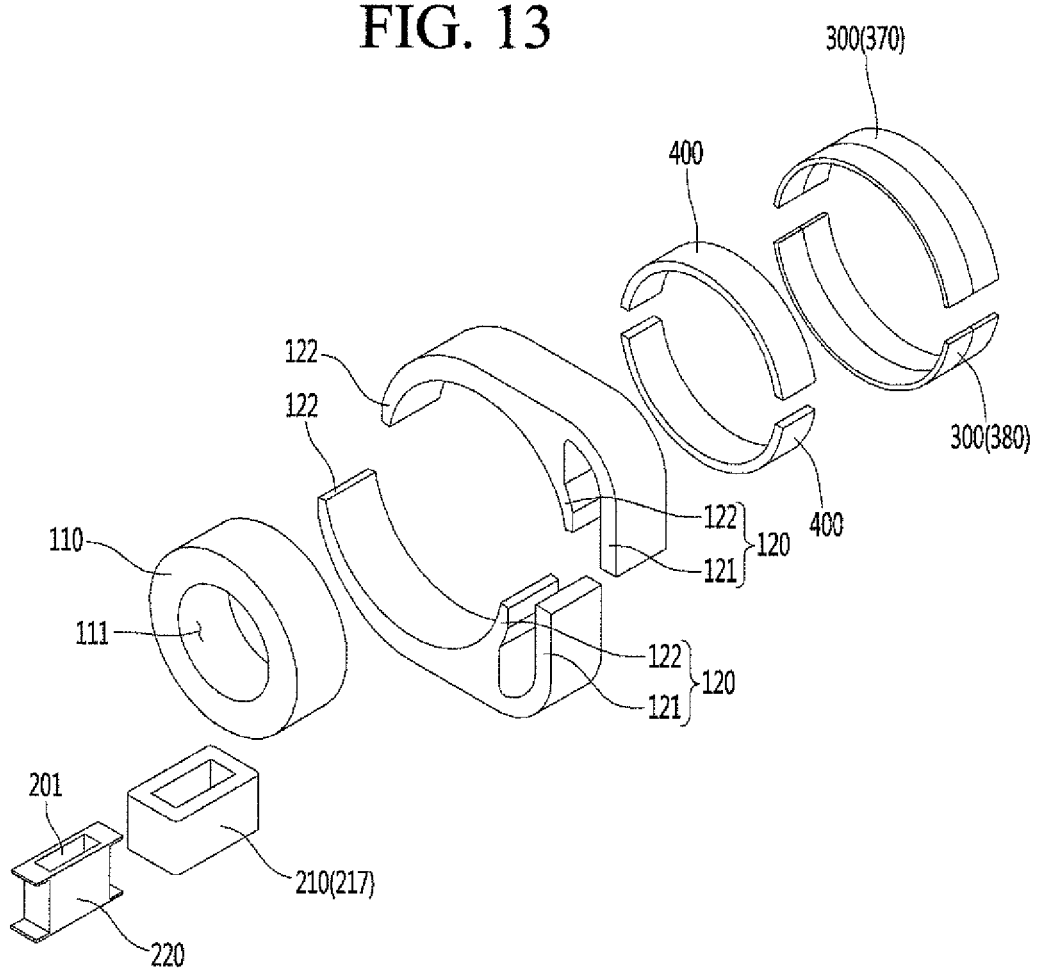
FIG. 13 is an exploded perspective view of the transverse flux reciprocating motor of FIG. 11.

FIG. 13 is an exploded perspective view of the transverse flux reciprocating motor of FIG. 11. Referring to FIG. 13, air gaps may be formed in centers of the longitudinal yoke parts 121b such that both sides of the longitudinal yoke parts 121b are separated. That is, air gaps may be formed between the yoke parts 121, as if the air gaps are formed between the teeth parts 122 facing each other.

In this case, the outer stator 120 may be divided into two outer stators. If the outer stator 120 is divided into two outer stators, the ends of the longitudinal yoke parts 121b facing each other may be inserted into cavity 201 of the magnet coil 210. Accordingly, flux may form a closed loop.

As the outer stator 120 is divided as described above, as the ends of the longitudinal yoke parts 121b are only inserted into the cavity 201 after winding the magnet coil 210 on a bobbin 220 having the cavity 201, the magnet coil 210 does not need to be wound on the longitudinal yoke parts 121b, thereby improving workability.

Figure 14:
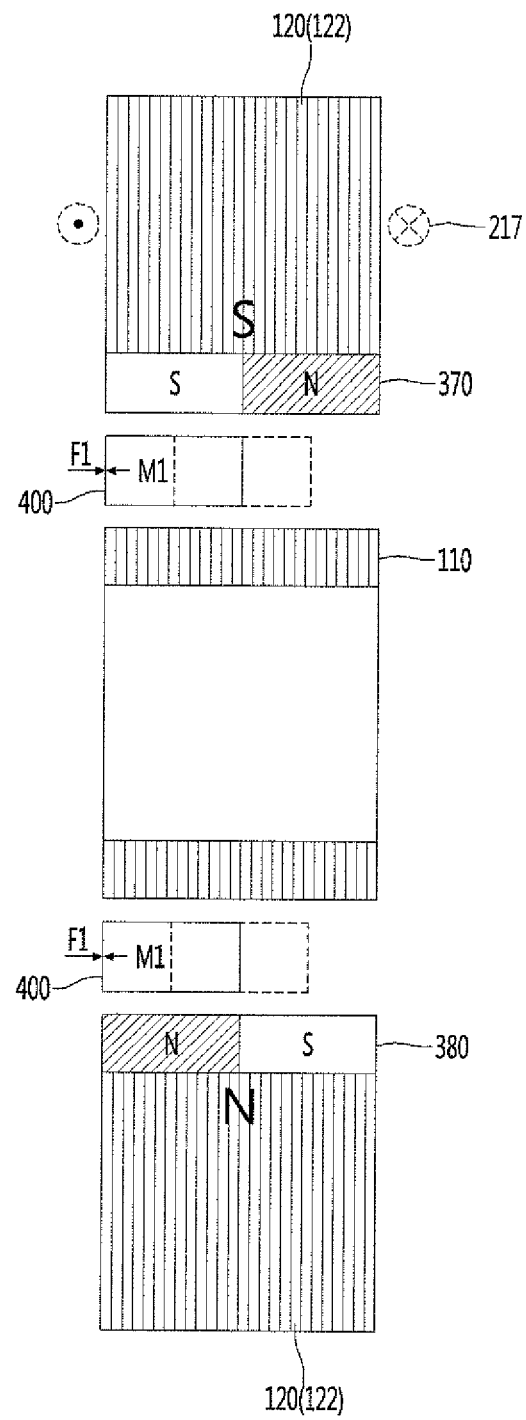
FIG. 14 is a schematic view taken along line XIV-XIV of FIG. 11 in order to explain operation of the reciprocating motor according to the embodiment.

FIG. 14 is a schematic view taken along line XIV-XIV of FIG. 11 in order to explain operation of the reciprocating motor according to an embodiment. Referring to FIG. 14, magnets 370 and 380 are respectively attached to the teeth parts 122 facing each other and form magnetic poles opposite to each other.

In this state, when current is applied to the magnet coil 217 coupled to the yoke part 121, both teeth parts 122 form different magnetic poles. The mover 400, which is the magnetic material, moves in a leftward direction (see arrow M1) of the figure in which the flux of the magnet coil 217 and the fluxes of the magnets 370 and 380 increase.

In addition, a reciprocating centering force (see arrow F1) to be restored in a rightward direction of the figure having low magnetic energy (that is, low magnetic position energy or low magnetic resistance) is accumulated among the mover 400, the stator 100, and the magnets 370 and 380. In this state, when the direction of current applied to the magnet coil 217 is changed, flux of the magnet coil 217 and fluxes of the magnets 370 and 380 increase in a direction opposite to a previous direction, that is, in the rightward direction of the figure.

By the accumulated reciprocating centering force F1 and magnetic force generated by the fluxes of the magnet coil (magnet coil 217) and the magnets 370 and 380, the mover 400 moves in the rightward direction of the figure. In this process, the mover 400 passes a center of the magnets 370 and 280 to further move in the rightward direction of the figure, by inertial force and magnetic force.

Even at this time, similarly, the reciprocating centering force to be restored in the center direction of the magnets 370 and 380 having low magnetic energy, that is, the leftward direction of the figure, is accumulated among the mover 400, the stator 100, and the magnets 370 and 380. In this manner, the mover 400 continuously and repeatedly reciprocates in the right and left directions of the figure, as if a mechanical resonant spring is provided.

Figure 15:
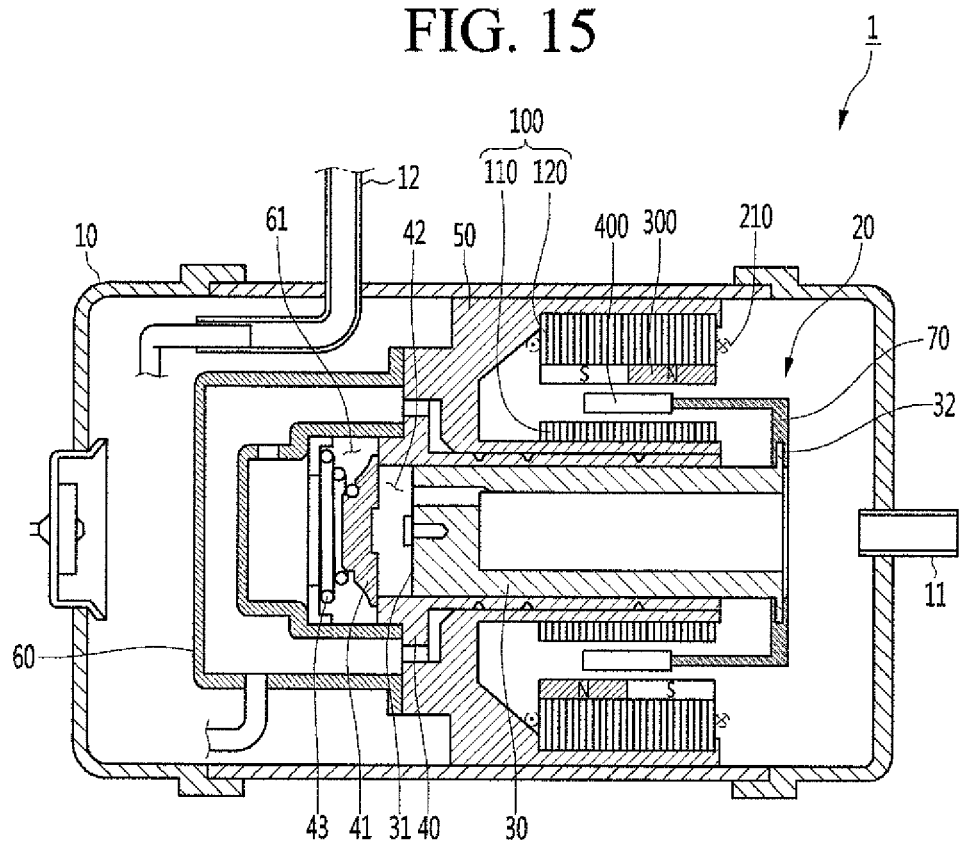
FIG. 15 is a longitudinal cross-sectional view of a reciprocating compressor, to which the reciprocating motor according to an embodiment is applied.

FIG. 15 is a longitudinal cross-sectional view of a reciprocating compressor, to which the reciprocating motor according to an embodiment. Referring to FIG. 15, the reciprocating compressor 1 according to this embodiment may include a case 10 having an internal space, a reciprocating motor 20 provided in the internal space of the case 10 and having a reciprocating mover 400, a piston 30 coupled to the mover 400 of the reciprocating motor 20 to reciprocate with the mover, a cylinder 40 having the piston 30 inserted thereto and forming a compression space 42, a suction valve 31 that opens and closes a suction side of the compression space 42 and a discharge valve 41 that opens and closes a discharge side of the compression space 42.

That is, a suction pipe 11 may be connected to the internal space of the sealed case 10 and a discharge pipe 12 that guides refrigerant compressed in the compression space 42 of the cylinder 40, which will be described hereinafter, to a freezing cycle may be connected to one side of the suction pipe 11. Therefore, the internal space of the case 10 may be filled with the suctioned refrigerant to form a suction pressure, and refrigerant discharged from the compression space 42 may be discharged to the outside of the case 10 toward a condenser through the discharge pipe 12.

A frame 50 may be formed in the internal space of the case 10. The reciprocating motor 20 that generates a reciprocating force and causes a resonant motion of the piston 30, which will be described hereinafter, may be fixed to one side of the frame 50.

The compression space 42 may be provided in the reciprocating motor 20 such that the cylinder 40 inserted into the frame 50 is coupled, and the piston 30, which is reciprocatingly inserted into the cylinder 40 to change a volume of the compression space 42 to compress refrigerant, may be coupled to the cylinder 40.

The suction valve 31 that opens and closes a suction flow channel of the piston 30 may be coupled to a front end of the piston 30, and the discharge valve 41 that opens and closes the compression space 42 of the cylinder 40 may be received in a discharge cover 60 and may be detachably coupled to a front end of the cylinder 40. The discharge cover 60 may be provided in a discharge space 61 to be fixed and coupled to the cylinder 40. The discharge valve 41 and a valve spring 43 that supports the discharge valve 41 may be received and an inlet of a gas bearing that lubricates a space between the cylinder 40 and the piston 30 may be received, in the discharge space 61 of the discharge cover 60.

The gas bearing (not shown) may include a gas passage formed between an inner circumferential surface of the frame 50 and an outer circumferential surface of the cylinder 40 and a plurality of fine gas through-holes that passes through an inner circumferential surface of the cylinder 40 from a middle of the gas passage.

The reciprocating motor 20 may have the configuration shown in FIGS. 1 to 14. Therefore, for the configuration of the reciprocating motor, refer to the above-described reciprocating motor.

However, in this embodiment, inner stator 110 and outer stator 120 may be fixed to the frame 50 and the mover 400 may be connected to the piston 30. Accordingly, when the mover 400 reciprocates with respect to the stator 100 and the magnet 300, the piston 30 inserted into the cylinder 40 may bidirectionally reciprocate along with the mover 400.

In the reciprocating compressor 1 according to an embodiment, when alternating current is applied to the magnet coil 210 of the reciprocating motor 20, alternating flux may be formed among the stator 100, the magnet 300, and the mover 400, and the mover 400 and the piston 30 connected thereto continuously reciprocate while moving in a direction in which flux of the magnet coil 310 and flux of the magnet 300 increase.

A reciprocating centering force to be restored to low magnetic energy may be accumulated between the mover 400 and stator 100 of the reciprocating motor 20 and the magnet 300. In this state, when a direction of current applied to the magnet coil 210 is changed, by the accumulated reciprocating centering force and magnetic force generated by fluxes of the magnet coil 210 and the magnet 300, the mover 400, and the piston 30 connected thereto move in a direction opposite to a previous direction. Even at this time, the reciprocating centering force to be restored to low magnetic energy is accumulated between the mover 400 and stator 100 of the reciprocating motor and the magnet 300.

In this manner, the mover 400 and the piston 30 continuously and repeatedly reciprocate in the rightward and leftward directions of the figure, as if a mechanical resonant spring is provided. The magnetic resonance spring may be formed among the mover 400, the stator 100, and the magnet 300 while the mover 400 reciprocates in the reciprocating motor, thereby causing resonant motion of the mover 400 and the piston 30. As a result, the piston 30 may compress refrigerant while overcoming a gas force generated in the compression space 42.

The reciprocating compressor according to embodiments may have the above-described operation effects according to the reciprocating motors of FIGS. 1 to 14. Therefore, for the operation effects of the reciprocating compressor, refer to the above-described reciprocating motor.

A reciprocating compressor according to embodiments may include a small-sized lightweight reciprocating motor, and thus, be a small size and lightweight. Accordingly, it is possible to easily mount, maintain, and repair the compressor.

Further, as a reciprocating motor having ease of manufacture and enhanced structural rigidity is included, it is possible to easily manufacture a compressor and to enhance structural rigidity of the compressor. Furthermore, by reducing the weight of the mover and minimizing a magnetic air gap of the mover, the stator, and the magnet, it is possible to drive the motor at a high speed and to improve motor efficiency. Therefore, it is possible to increase efficiency of the compressor.

Embodiments disclosed herein provide a reciprocating motor capable of using all resonant frequencies within a drive frequency. Embodiments disclosed herein further provide a reciprocating motor capable of downsizing a motor in an axial direction. Embodiments disclosed herein also provide a reciprocating motor capable of increasing motor efficiency by reducing a weight of a mover to decrease power consumption. Embodiments disclosed herein additionally provide a reciprocating motor capable of increasing motor output by increasing only a size of a magnet while maintaining a size of a mover.

Embodiments disclosed herein provide a reciprocating motor capable of minimally maintaining a magnetic air gap by tolerance by reducing a length of a mover. Embodiments disclosed herein provide a reciprocating motor capable of maximizing rigidity of a motor spring by a magnetic air gap. Furthermore, embodiments disclosed herein provide a reciprocating motor capable of reducing manufacturing costs by easily manufacturing a stator and a mover.

Embodiments disclosed herein provide a reciprocating motor capable of easily stacking blocks as compared to radial stacking and advantageously maintaining a stacked state by stacking the blocks configuring a stator or a mover in an axial direction in a surface contact state. Embodiments disclosed herein provide a reciprocating motor capable of improving workability by winding a magnet coil on a bobbin and then inserting an outer stator into a cavity of the bobbin. Also, embodiments disclosed herein provide a small-sized lightweight reciprocating compressor by downsizing the reciprocating motor.

A transverse flux reciprocating motor according to embodiments may include a stator having an inner stator and an outer stator located outside and spaced apart from the inner stator in a radial direction, at least one magnet coil wound on the stator, at least one magnet coupled to an outer circumferential surface of the inner stator or an inner circumferential surface of the outer stator and having different magnetic poles arranged in an orthogonal direction of flux generated by the magnet coil, and a mover inserted into a cavity formed between the inner stator and the outer stator, formed of a magnetic material and reciprocating with respect to the stator. Therefore, it is possible to reduce power consumption to increase motor efficiency, by reducing a weight of the mover. In addition, a movable core may be exposed to an air gap, and thus, a magnetic air gap among the movable core, the magnet, and the stator may be minimally maintained.

Further, the stator and/or the mover may be formed by stacking a plurality of core blocks in a reciprocating direction of the mover. Therefore, as the blocks configuring the stator or the mover are stacked in the axial direction while surface-contacting each other, stacking is easy as compared to radial stacking and a stacked state is advantageously maintained.

Furthermore, the outer stator may include a yoke part or yoke forming a magnetic path and teeth parts or teeth that extending from the yoke part in a radial direction to surround the mover, the magnet coil may be wound on and coupled to the teeth parts. An even number of teeth parts may be formed at a predetermined interval in a circumferential direction of the stator, and the magnet coil coupled to each of the teeth parts may generate flux in a direction opposite to a direction of flux generated by a neighboring magnet coil. The number of magnets may be equal to that of the magnet coils and the magnets may be arranged to have magnetic poles opposite to those of neighboring magnets.

The outer stator may include a yoke part or yoke forming a magnetic path and teeth parts or teeth that extend from the yoke part to surround the mover, and the magnet coil may be wound on the yoke part. The yoke part and the teeth parts may be separated, the magnet coil may form a cavity, and the yoke part may be inserted into the cavity of the magnet coil and then connected to the teeth parts or the teeth parts may be inserted into the cavity of the magnet coil and then connected to the yoke part. Therefore, after the magnet coil is wound on the bobbin, the outer stator may be inserted into the cavity of the bobbin, thereby improving workability.

The outer stator may be formed by stacking a plurality of stator core blocks having the yoke part and the teeth parts, and a fastening hole may be formed in the yoke part or the teeth parts and the plurality of stator core blocks may be fastened by a fastening member penetrating through the fastening hole. The stator may include the yoke part formed such that the magnet coils are provided at both sides of the teeth parts. The stator may include the yoke part formed such that the magnet coil is provided at one side of the teeth parts.

The yoke part coupled with the magnet coil may be divided into a plurality of yoke parts and the magnet coil forms a cavity, and at least one of the plurality of yoke parts may be inserted into the cavity of the magnet coil. Therefore, after the magnet coil is wound on the bobbin, the outer stator may be inserted into the cavity of the bobbin, thereby improving workability.

A plurality of magnets may be coupled in a circumferential direction of an outer circumferential surface of the inner stator or an outer circumferential surface of the outer stator and may be arranged to have magnetic poles different from those of neighboring magnets. The magnet coil may be wound on a bobbin having a cavity. The plurality of divided yoke parts may be inserted into the cavity of the magnet coil and then connected to each other.

A reciprocating compressor according to embodiments may include a case having an internal space, a reciprocating motor provided in the internal space of the case and having a reciprocating mover, a piston coupled to the mover of the reciprocating motor and reciprocating along with the mover, a cylinder having the piston inserted into and forming a compression space, a suction valve that opens and closes a suction side of the compression space, and a discharge valve that opens and closes a discharge side of the compression space. The reciprocating motor may include the above-described transverse flux reciprocating motor. Therefore, as a small-sized lightweight reciprocating motor is provided, a size and weight of the reciprocating compressor may be reduced.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transverse flux reciprocating motor, comprising:
a stator having at least one magnet coil wound thereon;
at least one magnet coupled to an inner circumferential surface of the stator and having different magnetic poles arranged in an orthogonal direction of flux generated by the magnet coil; and
a mover formed of a magnetic material and reciprocating with respect to the stator while moving in a direction in which the flux generated by the magnet coil and flux generated by the magnet increase, wherein the stator includes a yoke forming a magnetic path and teeth that extend from the yoke in a radial direction to surround the mover, wherein the at least one magnet coil is wound on and coupled to the teeth, and wherein the yoke and the teeth are separated, the at least one magnet coil forms a cavity, and the yoke is inserted into the cavity of the at least one magnet coil and then is connected to the teeth or the teeth are inserted into the cavity of the at least one magnet coil and then are connected to the yoke.

2. The transverse flux reciprocating motor according to claim 1, wherein at least one of the stator or the mover is formed by stacking a plurality of core blocks in a reciprocating direction of the mover.

3. The transverse flux reciprocating motor according to claim 1, wherein the stator includes an inner stator, and an outer stator spaced apart from the inner stator to form an air gap outside the inner stator in a radial direction.

4. The transverse flux reciprocating motor according to claim 1, wherein the stator is formed by stacking a plurality of stator core blocks having the yoke and the teeth, and wherein a fastening hole is formed in the yoke or the teeth and the plurality of stator core blocks are fastened by a fastening member penetrating through the fastening hole.

5. The transverse flux reciprocating motor according to claim 1, wherein an even number of teeth is formed at a predetermined interval in a circumferential direction of the stator, and wherein the at least one magnet coil comprises a plurality of magnet coils coupled respectively to each of the teeth to generate flux in a direction opposite to a direction of flux generated by a neighboring magnet coil.

6. The transverse flux reciprocating motor according to claim 5, wherein the number of magnets is equal to a number of the magnet coils and the plurality of magnets is arranged to have magnetic poles opposite to those of neighboring magnets.

7. A reciprocating compressor, comprising:
a case having an internal space;
a reciprocating motor provided in the internal space of the case and having a reciprocating mover;
a piston coupled to the mover of the reciprocating motor and reciprocating along with the mover;
a cylinder having the piston inserted into and forming a compression space;
a suction valve that opens and closes a suction side of the compression space; and
a discharge valve that opens and closes a discharge side of the compression space, wherein the reciprocating motor includes the transverse flux reciprocating motor according to claim 1.

8. A transverse flux reciprocating motor, comprising:
a stator having at least one magnet coil wound thereon;
at least one magnet coupled to an inner circumferential surface of the stator and having different magnetic poles arranged in an orthogonal direction of flux generated by the magnet coil; and
a mover formed of a magnetic material and reciprocating with respect to the stator while moving in a direction in which the flux generated by the magnet coil and flux generated by the magnet increase, wherein the stator includes a yoke forming a magnetic path and teeth that extend from the yoke to surround the mover, and wherein the at least one magnet coil is wound on the yoke.

9. The transverse flux reciprocating motor according to claim 8, wherein the yoke and the teeth are separated, the at least one magnet coil forms a cavity, and the yoke is inserted into the cavity of the at least one magnet coil and then is connected to the teeth or the teeth are inserted into the cavity of the at least one magnet coil and then are connected to the yoke.

10. The transverse flux reciprocating motor according to claim 8, wherein the stator is formed by stacking a plurality of stator core blocks having the yoke and the teeth, and wherein a fastening hole is formed in the yoke or the teeth and the plurality of stator core blocks are fastened by a fastening member penetrating through the fastening hole.

11. The transverse flux reciprocating motor according to claim 8, wherein the at least one magnet coil comprises a plurality of magnet coils, and wherein the stator includes the yoke formed such that the plurality of magnet coils are provided at both sides of the teeth.

12. The transverse flux reciprocating motor according to claim 8, wherein the stator includes the yoke formed such that the at least one magnet coil is provided at one side of the teeth.

13. The transverse flux reciprocating motor according to claim 12, wherein a plurality of magnets is coupled in a circumferential direction of an outer circumferential surface or an outer circumferential surface of the stator and is arranged to have magnetic poles different from magnetic poles of neighboring magnets.

14. The transverse flux reciprocating motor according to claim 12, wherein the yoke coupled with the at least one magnet coil is divided into a plurality of yokes and the at least one magnet coil forms a cavity, and wherein at least one of the plurality of yokes is inserted into the cavity of the at least one magnet coil.

15. The transverse flux reciprocating motor according to claim 14, wherein the at least one magnet coil is wound on a bobbin having a cavity.

16. The transverse flux reciprocating motor according to claim 14, wherein the plurality of yokes is inserted into the cavity of the at least one magnet coil and then is connected to each other.

17. A reciprocating compressor, comprising:
a case having an internal space;
a reciprocating motor provided in the internal space of the case and having a reciprocating mover;
a piston coupled to the mover of the reciprocating motor and reciprocating along with the mover;
a cylinder having the piston inserted into and forming a compression space;
a suction valve that opens and closes a suction side of the compression space; and
a discharge valve that opens and closes a discharge side of the compression space, wherein the reciprocating motor includes the transverse flux reciprocating motor according to claim 8.

* * * * *